Patented Feb. 28, 1950

2,498,629

UNITED STATES PATENT OFFICE 2,498,629

CONCENTRATED SULFURIC ACID PROCESSES

Charles W. MacKinnon, Sarnia, Ontario, Canada, assignor to Standard Oil Development Company, a corporation of Delaware No Drawing. Application October 10, 1947, Serial No. 779,223

2 Claims. (Cl. 196—40)

The present invention is concerned with processes utilizing concentrated sulfuric acid. The invention particularly relates to such processes wherein freezing or solidifying of the sulfuric acid is encountered. Specifically, the invention comprises a sulfuric acid composition containing a small percentage of hydrofluoric acid, which acid composition may be readily handled and employed in various refining and manufacturing operations at low temperatures.

It is known in the art to employ sulfuric acid as a manufacturing and refining agent in many operations. For example, in the treatment and in the production of petroleum oils for the manufacture of high quality lubricating oils sulfuric acid is employed in many phases. Also, sulfuric acid is employed in other refining operations, such as isomerization and alkylation. A serious disadvantage in the utilization of some concentrations of sulfuric acid, particularly in manufacturing activities carried on in cold climates, is that they solidify or freeze. This is especially true in those processes involving sulfuric acid wherein it is desired to conduct the process at a temperature below the normal freezing point of the sulfuric acid. In order to overcome this disadvantage, expensive procedures and handling charges are involved. Often it is necessary to connect and utilize hot water lines, steam lines, and the like to melt the sulfuric acid. I have now discovered, however, that if a small percentage of hydrofluoric acid is utilized in connection with the sulfuric acid a very low freezing point composition will be secured. Furthermore, my composition of sulfuric acid and hydrofluoric acid is particularly desirable for sulfuric acid compositions designed to be employed in the treatment of petroleum oils and lubricating oils. For example, I have discovered that hydrofluoric acid will depress the freezing point of sulfuric acid without impairing its efficiency in the treatment of lubricating oils.

In accordance with my invention, I employ a relatively small amount of the hydrofluoric acid, preferably not in excess of about 5%. In general, I prefer that from 1% to 2% of the hydrofluoric acid be employed, in the case of concentrated or anhydrous hydrofluoric acid. The hydrofluoric acid also may comprise a dilute hydrofluoric acid, as, for example, a 40% to 60% hydrofluoric acid solution. Under these conditions I would prefer to use a greater amount, as, for example, in the range from about 2% to 4%. Hydrofluoric acid in the percentages specified is added to, and mixed with, the sulfuric acid. The sulfuric acid concentration may be about 93% to 120% and particularly in the range of 97% to 102%.

The process of my invention may be readily understood by the following examples illustrating embodiments of the same.

EXAMPLE 1

A 98% sulfuric acid solution, which had a freezing point of 32° F., was mixed with 1% by weight of anhydrous hydrogen fluoride. Upon testing it was discovered that the mixture could be supercooled to about —12° F. while the true freezing point was apparently about —5° F.

EXAMPLE 2

A 98% sulfuric acid solution, which had a freezing point of 32° F, was mixed with 2% by weight of anhydrous hydrogen fluoride. Upon testing this composition had a freezing point of about —25° F., while the true freezing point was about —18° F.

EXAMPLE 3

A sulfuric acid solution of 98.5% concentration had a freezing point of 15° F. To this sulfuric acid was added 1% by weight of 60% hydrogen fluoride. The mixture of sulfuric acid and hydrofluoric acid had a freezing point of about —15° F. while the true freezing point was about —10° F.

EXAMPLE 4

A sulfuric acid solution of 98.5% concentration had a freezing point of 15° F. 2% by weight of 60% hydrofluoric acid was added to this acid. The resulting mixture could be cooled to —30° F. while the true freezing point was about —25° F.

EXAMPLE 5

A paraffinic lubricating oil distillate was given a standard treat with 98% commercial sulfuric acid and clay finished in the usual manner. The acid treatment is preferably carried out during agitation with air. The desired weight of acid is added gradually and continuously, or gradually in batchwise manner to the oil. Agitation with air is continued until the sludge particles are of maximum size. This agitation may require up to 20 minutes. The agitation is then discontinued and the sludge allowed to settle, after which time the oil layer is separated and the oil given the necessary clay treatment. The lubricating oil distillate had the following characteristics prior to treatment:

Table I

| | |
|---|---|
| Gravity, °American Petroleum Inst | 23.0 |
| Flash, °F. Cleveland Open Cup | 475 |
| Fire, °F. Cleveland Open Cup | 525 |
| Viscosity at 100° F. Saybolt Universal | 1050 |
| Viscosity at 210° F. Saybolt Universal | 78 |
| Viscosity index | 62 |
| Pour point, °F. A. S. T. M. D97–39 | +30 |
| Color, Tag-Rob | Too dark |
| Neutralization No., A. S. T. M. D663–46T | 0.07 |
| Sulfur, per cent | 0.40 |

The inspections tabulated and identified by the tests used, are generally used in the petroleum industry so that no further description of the tests is thought necessary.

Inspection of the treated lubricating oil showed the characteristics to be as follows:

Table II

| | |
|---|---|
| Gravity, °American Petroleum Inst | 23.7 |
| Flash, °F. Cleveland Open Cup | 465 |
| Fire, °F. Cleveland Open Cup | 520 |
| Viscosity at 100° F. Saybolt Universal | 1022 |
| Viscosity at 210° F. Saybolt Universal | 78.4 |
| Viscosity index | 68.8 |
| Pour point, °F. A. S. T. M. D97–39 | +30 |
| Color, Tag-Rob | 15 after color hold [1] 12¼ |
| Neutralization No., A. S. T. M. D663–46T | 0.028 |
| Sulfur, per cent | 0.38 |

[1] Color hold is Tag-Robinson color after treated oil is subjected to 212° F. for 16 hours.

The same paraffinic lubricating oil distillate was also treated with sulfuric acid containing 1% by weight of anhydrous hydrofluoric acid and the distillate was then finished in the usual manner with clay. As treated in this manner, the treated lubricating oil gave the following inspections:

Table III

| | |
|---|---|
| Gravity, °American Petroleum Inst | 23.6 |
| Flash, °F. Cleveland Open Cup | 470 |
| Fire, °F. Cleveland Open Cup | 510 |
| Viscosity at 100° F. Saybolt Universal | 995 |
| Viscosity at 210° F. Saybolt Universal | 78.0 |
| Viscosity index | 68.9 |
| Pour point, °F. A. S. T. M. D97–39 | +30 |
| Color, Tag-Rob | 14½ after color hold [1] 11¾ |
| Neutralization No., A. S. T. M. D663–46T | 0.03 |
| Sulfur, per cent | 0.37 |

[1] Color hold is Tag-Robinson color after treated oil is subjected to 212° F. for 16 hours.

It will be noted that the colors after acid and clay treating were of the same order with the mixed acid as with the sulfuric acid alone.

EXAMPLE 6

A naphthenic lubricating oil distillate was given a standard treat with 98% commercial sulfuric acid as described in Example 5 and clay finished in the usual manner. The naphthenic lubricating oil stock before treatment showed the following inspection:

Table IV

| | |
|---|---|
| Gravity, °American Petroleum Inst | 22.0 |
| Flash, °F. Cleveland Open Cup | 470 |
| Fire, °F. Cleveland Open Cup | 530 |
| Viscosity at 100° F. Saybolt Universal | 2036 |
| Viscosity at 210° F. Saybolt Universal | 98 |
| Viscosity index | 36.0 |
| Pour point, °F. A. S. T. M. D97–39 | +10 |
| Color, Tag.-Rob. | Too dark |
| Neutralization No., A. S. T. M. D663–46T | 0.47 |
| Sulfur, per cent | 0.96 |

After the treatment with the sulfuric acid and clay the lubricating oil showed the following inspection:

Table V

| | |
|---|---|
| Gravity, °American Petroleum Inst | 22.3 |
| Flash, °F. Cleveland Open Cup | 455 |
| Fire, °F. Cleveland Open Cup | 505 |
| Viscosity at 100° F. Saybolt Universal | 1441 |
| Viscosity at 210° F. Saybolt Universal | 89.8 |
| Viscosity index | 45.8 |
| Pour point, °F. A. S. T. M. D97–39 | +5 |
| Color, Tag-Rob | 10¾ after color hold [1] 10 |
| Neutralization No., A. S. T. M. D663–46T | 0.08 |
| Sulfur, per cent | 0.88 |

[1] Color hold is Tag-Robinson color after treated oil is subjected to 212° F. for 16 hours.

The same naphthenic lubricating oil distillate was also treated with a mixture of 98% sulfuric acid and 1% by weight of anhydrous hydrogen fluoride and finished in the usual manner with clay. The lubricating oil after treatment with the hydrofluoric acid mixture showed the following inspection:

Table VI

| | |
|---|---|
| Gravity, °American Petroleum Inst | 22.2 |
| Flash, °F. Cleveland Open Cup | 450 |
| Fire, °F. Cleveland Open Cup | 500 |
| Viscosity at 100° F. Saybolt Universal | 1596 |
| Viscosity at 210° F. Saybolt Universal | 90.0 |
| Viscosity index | 46.0 |
| Pour point, °F. A. S. T. M. D97–39 | +5 |
| Color, Tag-Rob | 13 after color hold [1] 12½ |
| Neutralization No., A. S. T. M. D663–46T | 0.07 |
| Sulfur, per cent | 0.86 |

[1] Color hold is Tag-Robinson color after treated oil is subjected to 212° F. for 16 hours.

It will be noted that the colors after acid and clay treating were somewhat better with the mixed acid than with sulfuric acid alone.

As heretofore described, the process of my invention comprises adding to and mixing with a sulfuric acid solution of 93% to 120% concentration about 1% to 2% of anhydrous hydrofluoric acid, or about 2% to 4% of dilute hydrofluoric acid. The composition of mixed acids prepared in this manner may then be used in conventional sulfuric acid treating processes. It is apparent that the mixture of sulfuric acid and hydrofluoric acid may be prepared prior to actual use in a given process or the mixture of sulfuric acid and hydrofluoric acid may be prepared in situ in a given reaction vessel. One application of my invention is in the carrying out of processes at temperatures below the normal freezing point of sulfuric acid as encountered in particularly cold climates. Again the low freezing point composition of my invention finds application in exothermic reaction processes wherein considerable cooling is necessitated. A more favorable heat balance may be obtained by introducing required sulfuric acid at the low temperatures to which my composition may be cooled without freezing. A further application of my invention is in those processes, regardless of climate, which are desired to be carried out at extremely low temperatures, below the normal freezing point of sulfuric acid. For example, in alkylation processes it is often desirable to alkylate at low temperatures, to avoid undesirable side reactions and to increase the octane rating of the alkylate product. This is especially true, for example, in the case of ethylene alkylation which it is preferred should be carried out below 0° C. In other respects alkylation processes carried out as taught by the present invention may follow conventional practices.

Having now fully described my invention, I claim:

1. In a process for refining petroleum utilizing sulfuric acid of about 98% concentration and conducted at temperatures below about 0° C., the improvement which comprises carrying out the said petroleum process with a composition of about 98% sulfuric acid to which has been added from 1% to 2%, by weight of hydrogen fluoride.

2. The process defined by claim 1 in which the said petroleum refining process is the refining of a lubricating oil distillate.

CHARLES W. MacKINNON.

REFERENCES CITED

The following references are of record in the file of this patent:

UNITED STATES PATENTS

| Number | Name | Date |
|---|---|---|
| 1,967,172 | Morrell | July 17, 1934 |
| 2,133,452 | Hewlett | Oct. 18, 1938 |
| 2,214,481 | Schmerling et al. | Sept. 10, 1940 |
| 2,276,250 | Morrell | Mar. 10, 1942 |
| 2,335,507 | Grosse et al. | Nov. 30, 1943 |